United States Patent
Crane et al.

(10) Patent No.: US 12,485,606 B1
(45) Date of Patent: Dec. 2, 2025

(54) SYSTEM AND METHOD FOR IMPROVING MECHANICAL PROPERTIES OF POLYMER POWDER BED FUSION PROCESSES

(71) Applicant: University of South Florida, Tampa, FL (US)

(72) Inventors: Nathan Brad Crane, Lutz, FL (US); Justin Troy Nussbaum, Tampa, FL (US); Garrett Michael Craft, Wesley Chapel, FL (US); Julie P. Harmon, Tampa, FL (US)

(73) Assignee: University of South Florida, Tampa, FL (US)

( * ) Notice: Subject to any disclaimer, the term of this patent is extended or adjusted under 35 U.S.C. 154(b) by 322 days.

(21) Appl. No.: 16/371,803

(22) Filed: Apr. 1, 2019

Related U.S. Application Data (60) Provisional application No. 62/650,701, filed on Mar. 30, 2018.

(51) Int. Cl.
  *B29C 64/00* (2017.01)
  *B22F 10/10* (2021.01)
  (Continued)

(52) U.S. Cl.
  CPC ............ *B29C 64/153* (2017.08); *B22F 10/10* (2021.01); *B28B 1/001* (2013.01); *B33Y 10/00* (2014.12); *B33Y 70/00* (2014.12); *B33Y 80/00* (2014.12); *B22F 2304/10* (2013.01); *B29C 64/264* (2017.08)

(58) Field of Classification Search
  CPC .............................. B29C 64/153; B33Y 10/00
  See application file for complete search history.

(56) References Cited

U.S. PATENT DOCUMENTS

| | | | |
|---|---|---|---|
| 4,863,538 | A | 9/1989 | Deckard |
| 4,938,816 | A | 7/1990 | Beaman et al. |

(Continued)

FOREIGN PATENT DOCUMENTS

WO  2019032224  2/2019

OTHER PUBLICATIONS https://www.additivalab.com/laser-sintering-vs-laser-melting/ (Year: 2021).*

(Continued)

*Primary Examiner* — Nicholas Krasnow
(74) *Attorney, Agent, or Firm* — Meunier Carlin & Curfman LLC (57) ABSTRACT

Sintering methods comprising (a) providing a layer of powder material on a platform; (b) projecting incident light from a source onto a surface area of the layer of powder material, wherein the incident light is projected for a sufficient time to densify the layer of powder material and form a layer of densified material; (c) optionally cooling the layer of densified material to a sufficient temperature to solidify or vitrify the layer of densified material to form a layer of sintered material; and (d) repeating steps (a) to (c) to form a sintered article in a layer-wise fashion are disclosed. The incident light may cause complete melting of the powder material or heat the powder material above its glass transition temperature. In general, the incident light is projected simultaneously and for a time span substantially the same as formation of the layer of densified material.

15 Claims, 3 Drawing Sheets

(51) Int. Cl.
*B28B 1/00* (2006.01)
*B29C 64/153* (2017.01)
*B33Y 10/00* (2015.01)
*B33Y 70/00* (2020.01)
*B33Y 80/00* (2015.01)
*B29C 64/264* (2017.01)

(56) References Cited

U.S. PATENT DOCUMENTS

| | | | |
|---|---|---|---|
| 5,648,450 A * | 7/1997 | Dickens, Jr. | B29C 64/153 428/317.9 |
| 7,088,432 B2 | 8/2006 | Zhang | |
| 8,383,985 B2 | 2/2013 | Twelves, Jr. et al. | |
| 11,148,319 B2 * | 10/2021 | DeMuth | B33Y 50/02 |
| 2004/0232583 A1 * | 11/2004 | Monsheimer | B29C 64/165 425/375 |
| 2006/0180957 A1 | 8/2006 | Hopkinson et al. | |
| 2009/0295042 A1 * | 12/2009 | Pfister | C08J 3/28 264/497 |
| 2011/0089610 A1 | 4/2011 | El-Siblani et al. | |
| 2012/0139167 A1 | 6/2012 | Fruth et al. | |
| 2012/0237745 A1 * | 9/2012 | Dierkes | C04B 35/653 427/532 |
| 2013/0295212 A1 | 11/2013 | Chen et al. | |
| 2014/0314613 A1 | 10/2014 | Hopkinson et al. | |
| 2015/0093279 A1 * | 4/2015 | Kington | B22F 10/20 419/19 |
| 2015/0145168 A1 * | 5/2015 | Rodgers | B29C 64/118 264/308 |
| 2017/0095882 A1 * | 4/2017 | Mireles | B33Y 10/00 |
| 2018/0272601 A1 * | 9/2018 | Erickson | B33Y 80/00 |
| 2019/0224913 A1 * | 7/2019 | Krol | B29C 64/153 |
| 2020/0247042 A1 * | 8/2020 | Gardiner | B29C 64/264 |
| 2021/0069989 A1 * | 3/2021 | DeFelice | B29C 64/393 |
| 2021/0197451 A1 * | 7/2021 | Barnes | B33Y 30/00 |
| 2022/0227040 A1 * | 7/2022 | Batchelder | B29C 64/147 |

OTHER PUBLICATIONS http://utw10945.utweb.utexas.edu/sites/default/files/2016/064-Nussbaum.pdf (Year: 2016).*

Furushima Y, Schick C, Toda A. Crystallization, recrystallization, and melting of polymer crystals on heating and cooling examined with fast scanning calorimetry. Polymer Crystallization. 2018; 1:e10005. https://doi.org/10.1002/pcr2.10005 (Year: 2018).*

Bai, J., et al., Influence of carbon nanotubes on the rheology and dynamic mechanical properties of polyamide-12 for laser sintering. Polymer Testing, 2014. 36: p. 95-100.

Bourell, D.L., et al., Performance Limitations in Polymer Laser Sintering. Physics Procedia, 2014. 56: p. 147-156.

Caulfield, B., P.E. McHugh, and S. Lohfeld, Dependence of mechanical properties of polyamide components on build parameters in the SLS process. Journal of Materials Processing Technology, 2007. 182(1-3): p. 477-488.

Crane, N.B., et al., Impact of chemical finishing on laser-sintered nylon 12 materials. Additive Manufacturing, 2017. 13: p. 149-155.

Dadbakhsh, S., et al., Effect of PA12 powder reuse on coalescence behaviour and microstructure of SLS parts. European Polymer Journal, 2017. 92: p. 250-262.

De Oliveira Setti, G., et al., Correlation between mechanical and surface properties of SLS parts. Rapid Prototyping Journal, 2014. 20(4): p. 285-290.

Drummer, D., K. Wudy, and M. Drexler. Modelling of the aging behavior of polyamide 12 powder during laser melting process. in Proceedings of PPS-30. 2015, 1664, 160007 Cleveland, Ohio.

Ellis, A., C.J. Noble, and N. Hopkinson, High Speed Sintering: Assessing the influence of print density on microstructure and mechanical properties of nylon parts. Additive Manufacturing, 2014. 1-4: p. 48-51.

Ellis, A., et al., Materials for high speed sintering. Journal of Materials Research, 2014. 29(17): p. 2080-2085.

GmbH, E. EOS Plastic Materials for Additive Manufacturing. Available from: https://www.eos.info/material-p.

Goodridge, R.D., et al., Processing of a Polyamide-12/carbon nanofibre composite by laser sintering. Polymer Testing, 2011. 30(1): p. 94-100.

Griessbach, S., R. Lach, and W. Grellmann, Structure-property correlations of laser sintered nylon 12 for dynamic dye testing of plastic parts. Polymer Testing, 2010. 29(8): p. 1026-1030.

Haworth, B., et al., Shear viscosity measurements on Polyamide-12 polymers for laser sintering. Rapid Prototyping Journal, 2013. 19(1): p. 28-36.

Hofland, E.C., I. Baran, and D.A. Wismeijer, Correlation of Process Parameters with Mechanical Properties of Laser Sintered PA12 Parts. Advances in Materials Science and Engineering, 2017. 2017: p. 1-11.

Hopkinson, N., C.E. Majewski, and H. Zarringhalam, Quantifying the degree of particle melt in Selective Laser Sintering®. CIRP Annals, 2009. 58(1): p. 197-200.

HP 3D High Reusability PA 12 Datasheet, 2017, 2 pages.

Liangbin Li, M.H.J.K., Wim H. de Jeu, Crystalline Structure and Morphology in Nylon-12: A Small-and Wide-Angle X-ray Scattering Study Macromolecules 2003. 36: p. 1626-1632.

Majewski, et al., Effect of the degree of particle melt on mechanical properties in selective laser-sintered Nylon-12 parts. Proceedings of the Institution of Mechanical Engineers, Part B: Journal of Engineering Manufacture 222.9 (2008): 1055-1064.

Rouholamin, D. and N. Hopkinson, An investigation on the suitability of micro-computed tomography as a non-destructive technique to assess the morphology of laser sintered nylon 12 parts. Proceedings of the Institution of Mechanical Engineers, Part B: Journal of Engineering Manufacture, 2014. 228(12): p. 1529-1542.

Van Hooreweder, B., et al., On the difference in material structure and fatigue properties of nylon specimens produced by injection molding and selective laser sintering. Polymer Testing, 2013. 32(5): p. 972-981.

Vasquez, M., B. Haworth, and N. Hopkinson, Optimum sintering region for laser sintered nylon-12. Proceedings of the Institution of Mechanical Engineers, Part B: Journal of Engineering Manufacture, 2011. 225(12): p. 2240-2248.

Verbelen, L., et al., Characterization of polyamide powders for determination of laser sintering processability. European Polymer Journal, 2016. 75: p. 163-174.

Yan, C., Y. Shi, and L. Hao, Investigation into the Differences in the Selective Laser Sintering between Amorphous and Semi-crystalline Polymers. International Polymer Processing, 2011. 26(4): p. 416-423.

Zarringhalam, H., C. Majewski, and N. Hopkinson, Degree of particle melt in Nylon-12 selective laser-sintered parts. Rapid Prototyping Journal, 2009. 15(2): p. 126-132.

U.S. Appl. No. 15/230,651, filed Aug. 8, 2016 and its prosecution history.

Kruth, G. Levy, F. Klocke, and T. H. C. Childs, "Consolidation phenomena in laser and powder-bed based layered manufacturing," CIRP Annals—Manufacturing Technology, vol. 56, No. 2, pp. 730-759, 2007.

Levy, Gideon N., Ralf Schindel, and Jean-Pierre Kruth. "Rapid manufacturing and rapid tooling with layer manufacturing (LM) technologies, state of the art and future perspectives." CIRP annals 52.2 (2003): 589-609.

Conley, James G., and H. L. Marcus. "Rapid prototyping and solid free form fabrication." Journal of Manufacturing Science and Engineering, Transactions of the ASME 119.4B (1997): 811-816.

* cited by examiner

SYSTEM AND METHOD FOR IMPROVING MECHANICAL PROPERTIES OF POLYMER POWDER BED FUSION PROCESSES

CROSS-REFERENCE TO RELATED APPLICATIONS

This application claims the benefit of U.S. Provisional Application No. 62/650,701 filed Mar. 30, 2018, the disclosure of which is hereby incorporated by reference in its entirety.

STATEMENT ACKNOWLEDGING OF GOVERNMENT SUPPORT

This invention was made with Government support under Grant No. CMMI-1563037 awarded by National Science Foundation. The government has certain rights in the invention.

BACKGROUND

Additive Manufacturing (AM) refers to processes whereby parts can be formed in three dimensions from CAD files by selectively adding or binding materials without the limitations of tooling or molds necessitated by conventional manufacturing techniques like injection molding (IM) [Van Hooreweder, B., et al., Polymer Testing, 2013. 32(5):972-981; Vasquez, M., B. et al., Proceedings of the Institution of Mechanical Engineers, Part B: Journal of Engineering Manufacture, 2011. 225(12):2240-2248; Goodridge, R. D., et al., Polymer Testing, 2011. 30(1): 94-100; and Yan, C., et al., International Polymer Processing, 2011. 26(4):416-423]. AM parts are formed in three dimensions from the sequential layering (Z-axis) of material in two dimensions (XY plane) within the part bed. Laser sintering (LS) is a common AM technology that uses a laser to sinter polymer particles in a powder bed. This laser is scanned at high rates over the powder bed, fusing the material in a point-wise fashion. LS generally provides good accuracy, rapid design to build times, and relatively good mechanical properties [Rouholamin, D. et al. Proceedings of the Institution of Mechanical Engineers, Part B: Journal of Engineering Manufacture, 2014. 228(12):1529-1542 and Bourell, D. L., et al., Physics Procedia, 2014. 56:147-156]. However, AM in general provides economic incentive versus traditional manufacturing methods only for small to medium size batches [Hofland, E. C., et al. Advances in Materials Science and Engineering, 2017:1-11]. Typically, AM parts also exhibit reduced strength when compared to traditional manufacturing such as injection molding (IM).

As such, it is well known that parts produced using additive manufacturing systems and methods currently known in the art commonly contain porosity after sintering. This porosity is known to have a deleterious effect on the properties of the parts, especially the ductility of the produced parts, which reduces the toughness of the parts.

Accordingly, what is needed in the art is an improved system and method for powder bed based fusion additive manufacturing that results in parts having improved ductility. However, in view of the art considered as a whole at the time the present invention was made, it was not obvious to those of ordinary skill in the field of this invention how the shortcomings of the prior art could be overcome.

SUMMARY

In accordance with the purposes of the disclosed methods, as embodied and broadly described herein, the disclosed subject matter, in one aspect, relates to sintering methods. The sintering methods can comprise (a) providing a layer of powder material on a platform; (b) projecting incident light from a source onto a surface area of the layer of powder material, wherein the incident light is projected at a predetermined optical intensity for a sufficient time to densify the layer of powder material and form a layer of densified material; (c) cooling the layer of densified material to a sufficient temperature to solidify or vitrify the layer of densified material to form a layer of sintered material; and (d) repeating steps (a) to (c) to form a sintered article in a layer-wise fashion.

The powder material used in the methods can be selected from a polymer, a metal, a ceramic, a composite material, or a combination thereof. In some examples, the powder material comprises a polymer such as an amorphous or a semi-crystalline polymer. Specific examples of polymers can include a polyamide, a polystyrene, a polyester, a polyacetal, a polyalkylene, cellulose, a poly ether ether ketone, a poly ether ketone, a poly ether ketone ketone, a poly (meth) acrylate, a polyimide, a thermoplastic urethane, a polyether, a polyketone, a polycarbonate, a thermoplastic elastomer, a polyolefin, a copolyester, a thermoplastic vulcanite, a polyethene, a polystyrene, a poly vinyl chloride, a blend thereof, a copolymer thereof, or a derivative thereof. The powder material comprises particles having an average particle diameter of from 5 to 250 microns, preferably from 5 to 100 microns.

As described herein, the sintering methods include projecting incident light from a source onto a surface area of the layer of powder material. The area (in $mm^2$) of the incident light projected on the surface of the layer of powder material and a thickness (in mm) of the layer of powder material can be in a ratio of at least 30:1, such as from 30:1 to 3000:1. Heating over the relatively large area of can be achieved by projecting an image from an image projector, from an array of LED or laser, or an effectively constant exposure obtained by repeatedly scanning a point source at high rate of speed over the surface of the powder material. The incident light projected from the light source may cause complete melting of the powder material or heat the powder material above its glass transition temperature. In general, the incident light is projected simultaneously and for a time span substantially the same as formation of the layer of densified material (i.e., elimination of porosity from the layer of powder material).

After the layer of densified material has been formed, the sintering methods can further comprise cooling the layer of densified material to below its recrystallization temperature or below its glass transition temperature to solidify or vitrify the densified material. Cooling can be conducted by exposure to ambient temperature, exposure to a cool air stream, depositing a cooler material (such as a cooler powder) on the layer of densified material, or in a thermally controlled chamber (e.g., a furnace) at a cooling rate of at least 1° C./min.

Alternate to the cooling step, the sintering method can include maintaining the layer of densified material at a temperature such that one or more physical states of the layer of densified material do not change prior to step (c). For example, the densified material can be maintained at a temperature where both liquid and solid are stable so the molten regions stay molten and the unmelted regions stay solid.

The sintering method can further include fusing individual subsections or an entire area of the multiple layered article and allowing each subsection or area to cool to form a 3D sintered article. Sintered articles formed from the methods disclosed herein are also described. The sintered articles can exhibit less than 2% by volume pores, as determined by the Archimedes density test. In some cases, the articles may be physically machined to form a final article.

In alternate embodiments, the sintering method can comprise (a) providing a layer of powder material on a platform; (b) projecting an incident light from a source onto a surface area of the layer of powder material to densify the layer of powder material and form a layer of densified material, wherein the incident light is projected simultaneously and for a time span substantially the same as formation of the layer of densified material; (c) repeating steps (a) to (b) to form a densified article in a layer-wise fashion; and (d) cooling the densified article to fuse individual subsections or an entire area of the densified article to form a sintered article.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

FIGS. 3A and 3B are graphs showing rheological data for PA 2202 PA12 powder.

FIGS. 5A-5E are images showing approximately 5 μm thickness microtome micrographs from cross-polarized light at 100× magnification. The images are shown with the Z-axis vertical. FIG. 5A shows Proto Labs LS PA 650. FIG. 5B shows Sheffield LS PA 2200. FIG. 5C shows EMS MJF. FIG. 5D shows Fully sintered LAPS PA2202. FIG. 5E shows undersintered LAPS PA2202.

DETAILED DESCRIPTION

The compositions, systems, and methods described herein may be understood more readily by reference to the following detailed description of specific aspects of the disclosed subject matter, the Figures, and the Examples included therein.

Before the present compositions, systems, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the specification and claims the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used. Further, ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Unless stated otherwise, the term "about" means within 5% (e.g., within 2% or 1%) of the particular value modified by the term "about."

As used herein, the term "composition" is intended to encompass a product comprising the specified ingredients in the specified amounts, as well as any product which results, directly or indirectly, from combination of the specified ingredients in the specified amounts.

Methods

Methods for improving mechanical properties of sintered articles are disclosed herein. The methods optimize the role of densification time and/or degree of particle melt (DPM) in the mechanical properties of sintered parts. In the methods disclosed herein, Large Area Projection Sintering (LAPS), or other forms of energy source is utilized to heat the material over an extended period of time and at lower intensities conventionally known. This allows even melting through moderate heating and extended timespans, thereby providing additional sintering time for the material to melt and densify into the desired cross section. This increased time also reduces thermal gradients both across and within the part bed. In particular, increasing the timescales for the heating process allows for greater transfer of heat from the surface layers to those below, allowing for greater fusion within and between layers. Further, the area of heating is large relative to the material layer thickness so that build speeds are maintained while obtaining the benefits of longer heating for smaller temperature gradients through a layer and time to densify. The mechanical properties of sintered parts using the controlled sintering at long timescales have shown improvements.

The sintering methods disclosed herein can be used in an additive manufacturing process. Such additive manufacturing process can include powder bed fusion processes for making parts formed from metal, ceramic, polymer, composite, ceramic-metal composite, alloy, or other powder materials.

In some embodiments, the materials can include a polymer such as an amorphous polymer or a semi-crystalline polymer. Amorphous polymers have all of their chain molecules arranged in a random manner, while semi-crystalline polymers have typically 50 to 60% of their chain molecules arranged in an orderly structure and the remainder in a disordered or amorphous state. This difference in aggregation structure may cause semi-crystalline and amorphous polymers to have different thermal properties and are considered in the methods disclosed herein.

Specific examples of polymers for use in the methods include a polyamide (e.g., nylon), a polystyrene, a polyester (e.g., polycaprolactone), a polyacetal, a polyalkylene (e.g., polypropylene or polyethylene), cellulose, a poly ether ether ketone, a poly ether ketone, a poly ether ketone ketone, a poly (meth)acrylate (e.g., poly methyl methacrylate), a polyimide, a thermoplastic urethane, a polyether, a polyketone, a polycarbonate, polylactic acid (PLA), a thermoplastic elastomer, a polyolefin, a copolyester (e.g., polyethylene terephthalates (PET)), a thermoplastic vulcanite, a polyethene, a polystyrene (e.g., styrene maleic anhydrides (SMA)), a polyvinyl chloride, chlorinated polyvinyl chlorides (CPVC), polyvinylidene chlorides, vinyl ester resins, polyhydroxyalkanoates (PHA), polyphenylene sulfide, acrylonitrile butadiene styrene (ABS), a blend thereof, a copolymer thereof, or a derivative thereof. Blends of the selected polymers may include blending the polymers with other powder materials. These powder materials may include, for example, at least one of glass beads, hollow glass spheres, other polymers, minerals, clays, flame-retardant additives, color additives, and/or other suitable materials.

In some embodiments, the materials can include a metal. Examples of suitable metal can include aluminum, aluminum alloys, titanium, titanium alloys, tungsten, tungsten alloys, vanadium, and vanadium alloys. Suitable ceramic materials can include aluminum oxide or alumina, zirconium oxide or zirconia, compact of particulate diamond, and/or pyrolytic carbon. In other embodiments, the material used in the processes described herein can include a fibrous material, a fabricated composition material, or a biological material such as bone powder.

The material comprises particles having an average particle diameter of 5 µm or greater, 5.5 µm or greater, 6 µm or greater, 7 µm or greater, 7.5 µm or greater, 8 µm or greater, 8.5 µm or greater, 9 µm or greater, 9.5 µm or greater, 10 µm or greater, 15 µm or greater, 20 µm or greater, 30 µm or greater, 40 µm or greater, 50 µm or greater, 60 µm or greater, 70 µm or greater, 80 µm or greater, 90 µm or greater, 100 µm or greater, 120 µm or greater, 150 µm or greater, 175 µm or greater, 200 µm or greater, or 250 µm or greater. In some embodiments, the material comprises particles having an average particle diameter of 250 µm or less, 200 µm or less, 175 µm or less, 150 µm or less, 125 µm or less, 100 µm or less, 90 µm or less, 80 µm or less, 70 µm or less, 60 µm or less, 50 µm or less, 40 µm or less, 30 µm or less, 20 µm or less, 15 µm or less, 10 µm or less, 9.5 µm or less, 9 µm or less, 8.5 µm or less, 8 µm or less, 7.5 µm or less, 7 µm or less, 6.5 µm or less, 6 µm or less, 5.5 µm or less, or 5 µm or less. The material can have an average diameter from any of the minimum values to any of the maximum values described above of the material. For example, the material can have an average diameter of from 5 µm to 250 µm, from 5 µm to 200 µm, from 5 µm to 150 µm, from 5 µm to 100 µm, from 10 µm to 100 µm, or from 10 µm to 90 µm. The average particle diameter (also referred to herein as average particle size) of the particles can be determined by laser light scattering, scanning electron microscopy (SEM) or transmission electron microscopy (TEM). Average particle size is synonymous with D50, meaning half of the population resides above this point, and half below.

In some embodiments, the material may be in the form of a powder that absorbs light at one or more wavelengths of light of the light source. In an additional embodiment, the material may further include an absorber that absorbs light at one or more wavelengths of light of the light source. Various absorbers could be added globally by premixing into the material, or locally, such as through inkjet printing, to help control the absorption areas of the layer of material.

In the sintering methods disclosed herein, the methods can include providing a layer of material, preferably in the form of a dry powder or slurry on a platform. The platform can be pre-heated to improve processing speed. In some examples, the platform can be pre-heated to temperatures below the initial melting temperature or glass transition temperature of the material. In other examples, the surface of the layer of material can be pre-heated to temperatures below the initial melting temperature or glass transition temperature of the material. In further examples, the platform and the surface of the layer of material can be preheated and maintained below the initial melting temperature or glass transition temperature of the material, for example, at about 170° C. By preheating the material to just under its melting temperature or glass transition temperature, less optical energy from the source (e.g., the projector) is required to melt or transition the material from a glass to a viscous phase and the internal stresses, which can lead to warping, can be reduced.

A heated chamber, or other thermally controlled chamber, may be used to pre-heat the material to a desired pre-heated temperature. In some embodiments, the interior of the heated chamber is subjected to standard atmospheric conditions, rather than an inert nitrogen environment.

The sintering methods disclosed herein can include projecting incident light from a source onto a surface area of the layer of material, wherein the incident light is projected at a predetermined optical intensity for a sufficient time to densify the layer of material to form a layer of densified material. The term "densify" or "densification" refers to the process of thermodynamically manipulating a material with the intent of increasing its density above that of a typical reference value, thereby increasing its energy storage potential. In the present case, the material is densified by eliminating porosity that exists between particles in the material and is primarily driven by reduction of the surface energy of the particles. The intensity of the incident light is high enough to cause sufficient heating of the material in order to change a solid material into a liquid, viscous or rubbery state which allows the material to flow. The liquefied, viscous or rubbery state of the material is allowed to densify to form the densified material.

In specific examples, amorphous materials exhibit a glass transition temperature (Tg). These materials are solid below their Tg. In the present case, the intensity of the light is high enough to heat the amorphous material above its glass transition temperature causing the molecular motion along the chains to greatly increase, and causing storage modulus to decrease substantially, and amorphous polymers become viscous (leathery or rubbery) and optionally then liquid. The Tg of an amorphous material can be obtained from its DSC curves.

In other specific examples, semi-crystalline materials exhibit a Tg as well as a melting temperature. Because semi-crystalline materials contain a distribution of molecular weights and crystal sizes, the melting process occurs over a temperature range rather than at a discrete temperature, and can be described with the initial melting temperature (Tim), peaking melting temperature (Tpm) and end melting temperature (Tem). Semicrystalline materials are usually solid. In the present case, the intensity of the light is high enough to heat the semi-crystalline material above its initial melting temperature, peaking melting temperature, or end melting temperature causing the crystals to begin to melt. In some cases, the intensity of the light is high enough to fully melt the material. The melting temperature or crystallization temperature of a semi-crystalline material can be obtained from its heating and cooling DSC curves.

As described herein, longer heating allows for more time to densify. Densification of the material can be determined by the degree of porosity in the densified material. The term "porosity" as used herein refers to a measure of the empty spaces (or voids or pores) in the material and is a ratio of the volume of voids to total volume of the mass of the material between 0 and 1, or as a percentage between 0 and 100%. Porosity can be measured by means known in the art such as by x-ray imaging, mercury porosimetry analysis, Archimedes density method, or standards including ISO 15901-2 or ASTM C830/B311.

The porosity of the materials disclosed herein is determined by the Archimedes density method. The Archimedes' density test is conducted on a 1 cm$^3$ cube in which any loosely sintered powder on the cube's exterior surface is mechanically removed (such as by cutting or grinding) to expose a smooth surface.

In the methods disclosed herein, the incident light can be projected simultaneously and for a time span that is the same or substantially the same as formation of the layer of densified material. Said another way, the incident light is projected to simultaneously and for a time span that is the same or substantially the same as elimination of the porosity from the material. "Substantially the same" when referring to the time span of the incident light means that the two time spans in question occurs simultaneously and encompass the same or similar duration of time. In some cases, the duration of time for which the incident light is projected can be the same or greater than 85%, greater than 90%, greater than 95%, greater than 96%, greater than 97%, greater than 98%, greater than 99%, greater than 99.5%, of the duration of time the material is allowed to densify (i.e., elimination of pores).

In some embodiments, the duration of time for which the incident light is projected can be the same time as the duration of time for elimination of greater than 85%, greater than 90%, greater than 95%, greater than 96%, greater than 97%, greater than 98%, greater than 99%, greater than 99.5% pores from the powder material. Conventionally, sintering processes heat over a much shorter time scale than they densify when processing viscous materials such as polymers. In particular, energy is generally added more quickly (such as by a scanning laser) and then densification continues after the energy source has been removed.

In some embodiments, the material is substantially densified or fully densified over the time span the incident light is projected on the material. The terms "substantially densified" and "fully densified" are relative based on the specific material being densified.

In particular, the terms "substantially densified" and "fully densified" when referring to the densification of the material refer to the change in porosity of the material after the incident light have been removed. For example, in some embodiments, the porosity of the densified materials remains the same as the sintered material (after cooling) disclosed herein. In these embodiments, the material is referred to as being "fully densified" from the incident light projected onto a surface area of the material. In other embodiments, some pores may continue to be eliminated from the material after removing the source of the incident light projected onto the material. In these embodiments, the material is referred to as being "substantially densified" from the incident light projected onto a surface area of the material. In particular embodiments, the porosity of the densified material may change by less than 10%, less than 9%, less than 8%, less than 7%, less than 6%, less than 5%, less than 4%, less than 3%, less than 2%, less than 1.5%, less than 1%, or less than 0.5%, after the source of incident light has been removed (for example, during the cooling step disclosed herein).

The densified materials can comprise less than 5% by volume pores (e.g., 4.5% by volume or less, 4% by volume or less, 3.5% by volume or less, 3% by volume or less, 2.5% by volume or less, 2% by volume or less, less than 2% by volume, 1.5% by volume or less, 0.9% by volume or less, or 0.5% by volume or less), based on the total volume of the densified material, as determined by the Archimedes density test. The densified materials can comprise from 0% to 5% by volume pores (e.g., from 0% to 5% by volume, from 0% to 4.5% by volume, from 0.1% to 4% by volume, from 0.1% to 3.5% by volume, from 0.1% to 2.5% by volume, from 0.1% to 2% by volume, from 0.1% to less than 2% by volume), based on the total volume of the densified material, as determined by the Archimedes density test. In some embodiments, the density of the densified materials disclosed herein does not increase substantially (or the porosity does not substantially decrease) after the incident light have been removed.

Without wishing to be bound by theory, heating the materials for longer periods of times and holding for densification reduce the porosity of the sintered materials disclosed herein. When pores are present, mechanical properties are reduced. Moreover, these defects may be concentrated between layers and may lead to anisotropy. Conventional sintering methods were unable to obtain the low degree of porosity as the sintered materials exemplified herein.

The benefits of longer heating while maintaining build speed can be achieved through a relatively large area of heating (incident light) compared to the layer thickness of the material. In some cases, the thickness of the material layer may be limited by its particle size. In general, layer thickness is greater than particle size, preferably at least two times the mean particle size of a powder material and larger than the largest particle size of the powder material. The maximum layer thickness is related to the heat transfer through the material. Incident light is either reflected, absorbed, or transmitted. Preferably, the layer thickness and particle size are selected so that a large portion (preferably at least 50%) of the light is absorbed and preferably around 70-90% is absorbed in a single layer. If very high fractions of the light are absorb in a single layer (>95%) then the temperature gradients through the layer increase. In some cases, for example for large layer thickness, an absorber can be added to the material or it can be deposited between layers so that it absorbs from the bottom up. In general, the layer of material has a thickness of from 10 microns to 1 mm (e.g., from 20 microns to 1 mm, from 50 microns to 1 mm, from 75 microns to 1 mm, from 100 microns to 1 mm, from 20 microns to 750 microns, from 50 microns to 750 microns, from 50 microns to 500 microns, from 100 microns to 750 microns, from 100 microns to 500 microns, or from 100 microns to 300 microns).

As described herein, the ratio of an area (in $mm^2$) of the incident light projected on the surface of the material and a thickness (in mm) of the layer of material is relatively large. In some embodiments, the ratio of an area (in $mm^2$) of the incident light projected on the surface of the material and a thickness (in mm) of the layer of material can be at least 30:1 (e.g., at least 30:1, at least 50:1, at least 75:1, at least 100:1, at least 150:1, at least 200:1, at least 300:1, at least 500:1, at least 750:1, at least 1000:1, at least 1500:1, at least 2000:1, at least 2500:1, at least 3000:1, at least 5000:1, at least 7500:1, at least 10000:1, at least 15000:1, at least 20000:1, at least 30000:1, at least 45000:1, at least 50000:1, at least 60000:1, at least 75000:1, or at least 100000:1). In some embodiments, the ratio of an area (in $mm^2$) of the incident light projected on the surface of the material and a thickness (in mm) of the layer of material can be from 30:1 to 100000:1 (e.g., from 30:1 to 75000:1, from 30:1 to 50000:1, from 30:1 to 45000:1, from 30:1 to 30000:1, from 30:1 to 20000:1, from 30:1 to 10000:1, from 30:1 to 5000:1, from 30:1 to 4000:1, from 30:1 to 3000:1, from 50:1 to 5000:1, from 50:1 to 3000:1, or from 100:1 to 3000:1). In one embodiment of the present disclosure, the area of the incident light projected on the surface of the material is such that an entire layer of material is densified together at one time.

Heating (i.e., source of incident light) can be performed by projecting an image from an image projector onto a surface area of the layer of material. Particularly, in the methods disclosed herein, Large Area Projection Sintering (LAPS), can be utilized for heating. LAPS uses a visible light projector to heat subsections or an entire desired shape in the XY-plane in a single exposure utilizing a high power projection system. Additive manufacturing processes using LAPS is disclosed in PCT/US2018/040624 and U.S. Ser. No. 15/230,651, the disclosures of which are hereby incorporated by reference in their entirety. In some embodiments, the LAPS processing system includes a platform for supporting a layer of material and at least one image projector, where the at least one image projector further includes, a light source, a digital light switch to modulate the light source based upon a digital signal to produce at least one image, at least one lens coupled to the digital light switch.

In the material processing system of the present invention, the at least one image projector is configured to project the at least one image through the at least one lens and onto a surface area of the layer of material, wherein an intensity of the at least one image is sufficient to heat the layer of material to a desired temperature.

The system may further include a heated chamber to preheat the powdered material prior to exposing the material to the light from the projector. The light from the projector may be provided through a projection window positioned over the material. The system may further include a thermocouple or other temperature measurement device, such as a pyrometer or an infrared camera to measure the surface temperature from a distance or a thermistor which could be positioned within the material to measure the temperature of the material during the process. In the present disclosure, a blade or roller may be used to spread new uniformly smooth layers of the material over an aluminum platform. In one embodiment of the present disclosure, the high intensity projector provides a concentrated 7.3 W of optical power onto a 3.7 $cm^2$ exposure area. As such, the projection system is capable of exposing an entire layer of material simultaneously over the course of a few seconds. This method allows for longer exposure times without compromising the overall build time, which enable improved properties for processing of a wider variety of materials. In an additional embodiment, the systems may further include a thermal camera to provide temperature feedback for the thermal feedback mechanism. The thermal camera can be positioned to collect thermal data from the surface of the material. In various embodiments, the thermocouples, pyrometers, and thermistors may also used to complement or calibrate the thermal camera since it can be sensitive to multiple types of error.

In a particular embodiment, a plurality of image projectors may be used to simultaneously project different images onto different surface areas of the layer of material, thereby increasing the processed area. For example, multiple projectors can be arranged in a 1D array (straight line) and scanned in 1 direction over the entire bed. In addition, the image may be comprised of a plurality of partial images and the image projector may be controlled to project each of the partial images onto a different surface area of the layer of material, thereby forming a complete image. In other embodiments, a single projector can be scanned in 1 direction over the entire bed.

While the LAPS technology has been demonstrated as one possible implementation path, it is considered to be within the scope of the present invention to utilize other means of heating (i.e., other sources of incident light) the powder material. For example, heating can be performed by selectively illuminating an array of lights (e.g., small LEDs or laser) to create an illuminated region which is then projected as incident light onto the surface of the material. In other embodiments, heating can be performed by scanning a point source (such as a laser) at high rate of speed repeatedly over a surface of the material so that it acts more like a lower intensity constant exposure. Other forms of energy source include a scanning mirror galvanometer or a lamp. Any combination of the energy sources disclosed herein can be used sequentially (in any order) or simultaneously in the methods disclosed. For example, a combination of laser and scanning mirror galvanometer can be used as an energy source.

In contrast with conventional sintering techniques known in the art, in the proposed material processing system, the incident light is projected over the course of a few seconds, instead of a few milliseconds, thereby allowing sufficient time for densifying the material. For example, the incident light is projected greater than 100 ms, greater than 1 s, greater than 2 s, greater than 5 s, greater than 7 s, greater than 8 s, greater than 10 s, greater than 12 s, greater than 15 s, from 100 ms to 30 s, from 1 s to 15 s, or from 1 s to 10 s. The extended time also allows for monitoring (including in-situ monitoring) and control systems to be implemented. For example, the intensity of the incident light can be controlled based on the temperature of the material in each spot. The incorporation of monitoring and control systems improves the quality of the resulting components by ensuring that every location within the material layer has been heated in accordance with the correct thermal profile. In the projected incident light (e.g., the projected image), varying levels of power can be projected onto the material. In some embodiments, the incident light is projected at a power level from 1 W/cm$^2$ to 50 W/cm$^2$, from 1 W/cm$^2$ to 30 W/cm$^2$, from 1 W/cm$^2$ to 15 W/cm$^2$ or from 2 W/cm$^2$ to 15 W/cm$^2$. In specific examples, the methods include projecting an image over a 100 ms to 10 s time span at from 1 W/cm$^2$ to 50 W/cm$^2$ from an image projector (LAPS processing system) onto a surface area of the layer of material.

The sintering methods can further include cooling the layer of densified material to a sufficient temperature to solidify or vitrify the layer of densified material to form a layer of sintered material. The term "sinter" can be used to describe how particles can be fused in the solid state. The intensity of the light causes sufficient heating of the material in order to change a solid powdered material into a liquid or viscous state. The liquefied or viscous state of the material densifies and is then allowed to return to a solid or vitrified state by cooling, thereby creating a sintered material.

The cooling rate and the temperature which the material is cooled to can vary depending on the type of material used as well as the desired properties. In some examples, the material can be cooled to below the glass transition temperature (Tg) of the material. In some examples, the material can be cooled to below the melting temperature (Tm) of the material. In some examples, the material can be cooled to the initial crystallization temperature (Tic), peaking crystallization temperature (Tpc) and end crystallization temperature (Tec) of the material. In some examples, the material can be cooled to partially solidify or completely solidify the densified material. In some examples, the material can be cooled to partially recrystallize or completely recrystallize the densified material. In some examples, the material can be cooled to partially vitrify or completely vitrify the densified material. For example, the material can be cooled to less than 500° C., less than 450° C., less than 400° C., less than 350° C., less than 300° C., less than 250° C., less than 200° C., less than 150° C., less than 100° C., less than 90° C., less than 80° C., less than 70° C., less than 60° C., less than 50° C., less than 45° C., less than 35° C., less than 30° C., 25° C. or less, less than 25° C., less than 20° C., less than 15° C., or to ambient (room) temperature. In specific examples, a material comprising a polyamide (such as nylon) can be cooled to ambient (room) temperature.

To optimize the properties of the material disclosed herein, a cooling rate of at least 1° C./min can be used. For example, the material can be cooled at a rate of at least 2° C./min, at least 5° C./min, at least 10° C./min, at least 15° C./min, at least 20° C./min, at least 25° C./min, at least 30° C./min, at least 40° C./min, at least 50° C./min, at least 60° C./min, at least 70° C./min, at least 75° C./min, at least 80° C./min, at least 90° C./min, at least 100° C./min, at least 1° C./s, at least 5° C./s, at least 10° C./s, at least 20° C./s, at least 30° C./s, at least 40° C./s, at least 50° C./s, at least 60° C./s, at least 70° C./s, at least 80° C./s, at least 90° C./s, or at least 100° C./s. In some embodiments, the materials can be cooled at a rate of from 10° C./s to 300° C./s, from 10° C./s to 200° C./s, from 10° C./s to 150° C./s, from 10° C./s to 120° C./s, from 30° C./s to 150° C./s, from 30° C./s to 100° C./s, from 50° C./s to 150° C./s, from 50° C./s to 100° C./s, from 75° C./s to 150° C./s, from 80° C./s to 150° C./s, from 100° C./s to 300° C./s, from 100° C./s to 150° C./s, from 100° C./s to 140° C./s, from 100° C./s to 135° C./s, or from 105° C./s to 150° C./s.

Cooling can be carried out by any suitable method. In some embodiments, the sintering system can include internal cooling pipes through the platform or other means which are used to cool the material. In some embodiments, the material may be removed from the platform into a separate cooling vessel. In still other embodiments, the material can be exposed to a specific temperature such as exposure to ambient air or placed into a water bath at ambient or any desired temperature. The bath can be agitated, for example, using compressed air for more efficient cooling. A cooler material such as a cooler powder can be deposited on the layer of densified material. In still other embodiments, the material can be cooled via jet quenching. In still further embodiments, the material can be cooled by exposure to a cool air stream or in a thermally controlled chamber (e.g, a furnace) at a set cooling rate, such as at least 1° C./min.

In alternate embodiments, the densified article is not cooled between layers. Rather, the method can comprise maintaining the layer of densified material at a temperature such that one or more physical states of the densified material do not change prior to adding another layer until a complete component is formed. For example, the densified material can be maintained at a temperature where both liquid and solid are stable so the molten regions stay molten and the unmelted regions stay solid.

In some embodiments of the sintering process, incident light at a substantially constant power level is incident on a material and a lateral layer of the part is fabricated by simultaneously projecting the incident light on a subsection or over an entire surface area of the material to densify the material optionally followed by cooling, until the entire layer has been sintered. When one layer is complete, the surface of the sintering bed is lowered, another layer of powder is spread over the previous, now sintered layer, and the next layer is scanned. As a layer is completed, another layer of powder is deposited on top of the previous layer, either by a blade, a roller mechanism or some other uniform powder spreading technique and the process is repeated until a complete component (sintered article) is formed.

The sintering methods disclosed herein can further comprise fusing individual subsections or an entire area of the multi-layered article and allowing each subsection or area to cool to form a 3D sintered article. In one embodiment of the present disclosure, the light from a source such as from a LAPS projection system may be used to fuse the multi-layer sintered article over individual subsections or over an entire area of the sintered article at one time.

Sintered articles formed from the methods disclosed herein are also described. The sintered articles can comprise less than 5% by volume pores (e.g., 4.5% by volume or less, 4% by volume or less, 3.5% by volume or less, 3% by volume or less, 2.5% by volume or less, 2% by volume or less, less than 2% by volume, 1.5% by volume or less, 0.9% by volume or less, or 0.5% by volume or less), based on the total volume of the sintered articles, as determined by the Archimedes density test. The sintered articles can comprise from 0% to 5% by volume pores (e.g., from 0% to 5% by volume, from 0% to 4.5% by volume, from 0.1% to 4% by volume, from 0.1% to 3.5% by volume, from 0.1% to 2.5% by volume, from 0.1% to 2% by volume, from 0.1% to less than 2% by volume), based on the total volume of the sintered articles, as determined by the Archimedes density test.

The methods disclosed herein can form a sintered article exhibiting increases in ultimate tensile strength (UTS) and/or elongation to break. For example, the sintered article can exhibit at least 5%, at least 10%, at least 15%, at least 20%, at least 25%, or at least 50%, increase in ultimate tensile strength (UTS) and/or elongation to break compared to a sintered article prepared using a method excluding a cooling step between layers or heating for longer periods of time to densify the powder material.

EXAMPLES

The following example is set forth below to illustrate the methods and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Figure 1:
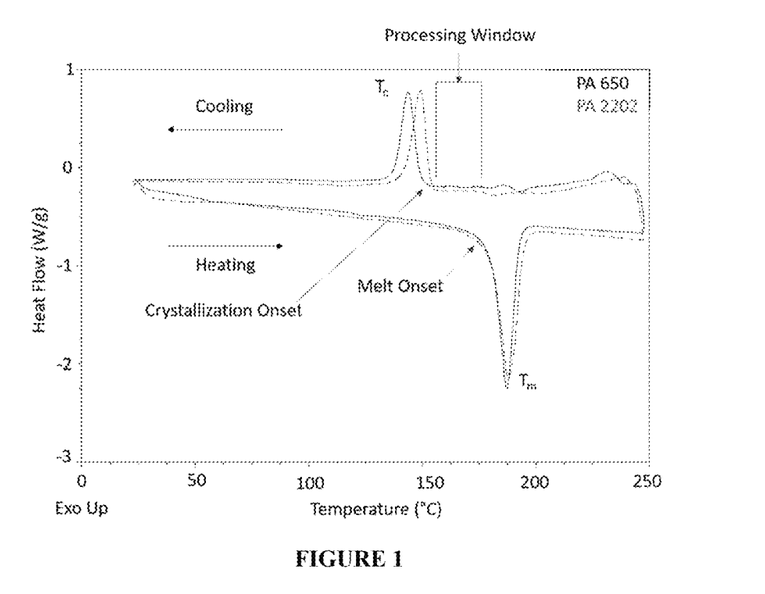
FIG. 1 is a graph showing stacked DSC thermograms of two PA12 powders (PA 650 and PA2202) illustrating the relative positions of Tc (144 and 148° C.) and Tm (187 and 188° C.) corresponding with the processing windows of the powders. Heating rate of 20° C./min under nitrogen purge. PA 2202 is similar to PA 650 but also contains a black pigment and displays an earlier Tc.

Example 1: Impact of Extended Sintering Times on Mechanical Properties in PA-12 Parts Produced by Powderbed Fusion Processes Laser sintering (LS) polymers are not selected based solely upon their end performance, but also on compatibility with AM process constraints. One criterion is the presence of a supercooling processing window in which there is a large gap between the crystallization temperature (Tc) and melting temperature (Tm) [Vasquez, M., B. et al. Proceedings of the Institution of Mechanical Engineers, Part B: Journal of Engineering Manufacture, 2011. 225(12):2240-2248 and Verbelen, L., et al., European Polymer Journal, 2016. 75: p. 163-174]. The semicrystalline polymer Nylon-12 (Polyamide 12, or PA12) is one of the dominant materials used because it offers a large processing window (FIG. 1) which facilitates printing and because of this, PA12 represents approximately 95% of LS material [Rouholamin, D. et al. Proceedings of the Institution of Mechanical Engineers, Part B: Journal of Engineering Manufacture, 2014. 228(12): 1529-1542 and Dadbakhsh, S., et al., European Polymer Journal, 2017. 92:250-262]. Polymeric part beds are usually maintained slightly below the Tm, minimizing the heat input needed to reach the Tm and densify the polymer powder. Additionally, by maintaining a temperature above the Tc, the sintered structure remains in an amorphous phase to retard crystallization [Vasques et al.]. Uneven crystallization can cause part warpage and delamination of layers. To remedy this, part beds are maintained within the processing window during the build process and slowly cooled to room temperature when the build is complete.

Laser sintering uses a high-power CO2 laser to heat polymeric powders. In order to maximize build rate with a point source, the tightly-focused laser is scanned rapidly (~10 m/s) exposing powder particles for ~0.1 milliseconds to heat each location of the part bed. However, because heat travels relatively slowly in PA12 due to poor thermal conductivity of nylon and even lower thermal conductivity in the powdered form, there is limited heat transfer to adjacent particles. Under typical LS conditions, the spherulites of semicrystalline PA12 powder typically do not completely melt [Dadbakhsh, S., et al., European Polymer Journal, 2017. 92:250-262; Majewski, C., H. et al. Proceedings of the Institution of Mechanical Engineers, Part B: Journal of Engineering Manufacture, 2008. 222(9):1055-1064; and Bai, J., et al., Polymer Testing, 2014. 36:95-100]. LS part anisotropy is often related to the build orientation and the effects of poor densification inherent with this point-wise construction. Short densification time scales are used in industrial processes to optimize for speed and accuracy versus end part properties [Caulfield, B., et al. Journal of Materials Processing Technology, 2007. 182(1-3):477-488; and Griessbach, S., R. et al. Polymer Testing, 2010. 29(8): 1026-1030]. One useful process metric is "Degree of Particle Melt" (DPM). DPM relates the amount of melted and re-crystallized material formed during a sintering process to the amount of original un-molten material which did not sinter [Majewski, C. H., et al.]. DPM is most easily calculated from Differential Scanning calorimetry (DSC) techniques. The presence of two endothermic melt peaks in a DSC measurement implies incomplete sintering (low DPM), with the higher-temperature endotherm corresponding to the unsintered core crystalline structure, and the lower-temperature endotherm corresponding to the melted and recrystallized crystals formed during sintering [Zarringhalam, H., C. et al. Rapid Prototyping Journal, 2009. 15(2):126-132]. The PA12 PA 2200 (EOS GmbH) is reported to be solution-precipitated at high temperatures with ethanol [Dadbakhsh, S., et al.]. This processing method is intended to produce highly uniform and highly spherical powder particles needed for optimal high-resolution sintering, and is noted for achieving high crystallinity (44% for EOS PA 2200, Dadbakhsh et al.).

Prior studies indicate that LS-produced parts characteristically display good strength, but reduced ductility compared to injection molded (IM) parts. This is reportedly due to the rapid cooling inherent to IM manufacturing resulting in lowered crystallinity, and the alignment of polymer chains occurring from shearing forces during the injection process [Bourell, D. L., et al., Physics Procedia, 2014. 56:147-156]. Injection molded (IM) PA12 is reported to have an elongation at break (EaB) of ca. 200-300%, an ultimate tensile strength (UTS) of ca. 66 MPa and a Young's Modulus of ca. 1500 MPa [Hopkinson, N., et al. CIRP Annals, 2009. 58(1):197-200]. Whereas LS PA12 shows comparable Modulus with a decreased UTS of ca. 45-50 MPa and far lower EaB of ca. 20%.

Another explanation for the dramatic reduction in ductility could be the presence of porosity in the LS parts. Literature reports show that porosity often ranges from 3-6% for LS material with myriad pore morphologies and dimensions possible [Rouholamin, D. et al. Proceedings of the Institution of Mechanical Engineers, Part B: Journal of Engineering Manufacture, 2014. 228(12):1529-1542]. Rouholamin et al used micro-computed tomography (CT) and reported average pore dimensions of 20-25 µm as a function of laser wattages ranging from 12.5 to 25 W. They reported that pore size remains rather constant regardless of laser power, with higher laser wattages appearing to damage surface layers.

Reduced DPM and, in particular, the presence of particle cores is cited as being one of the most prominent mechanisms responsible for part failure [Bourell, D. L., et al.]. Pores and cores often reside between layers and manifest anisotropic properties due to the stratified nature of their distributions relating to build depth and Z-axis layering of parts [Bourell, D. L., et al.]. LS part anisotropy is documented by Hofland et al. who measured tensile properties in coupons built in orthogonal orientations. It was hypothesized that layer orientation is the cause of this variation, as layer interfaces are often the weakest regions of samples [Hofland, E. C., et al.]. Prior LS studies have shown that increased DPM increases the tensile strength, Young's Modulus and elongation at break (EAB) [Hofland, E. C., et al. and Majewski, C., H. et al.].

Porosity and reduced DPM can result from uneven part bed temperature distributions common in industrial systems. The temperature gradients can occur over long times and at large scale due to differences in temperature in printed and unprinted regions or at short time and length scales due to the uneven absorption of the laser energy through the layer thickness. Both phenomena can create regions which are either too cool to fully sinter or are too hot once illuminated [Bourell, D. L., et al.].

Figure 2:
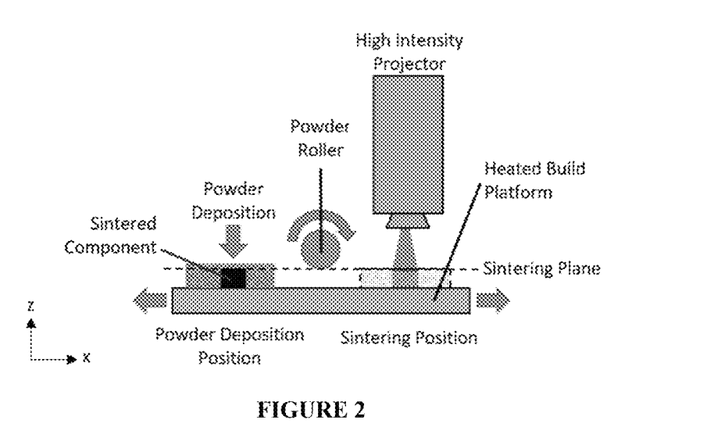
FIG. 2 is a schematic image of a Large Area Projection Sintering (LAPS) System. The heated metal plate maintains part bed temperature (measured via FLIR infrared camera).

The present example addresses the role of densification time and DPM in mechanical properties of sintered PA12 parts. The mechanical properties of PA12 parts sintered at different timescales using three different processes are compared. For controlled sintering at long timescales (1-5 s), Large Area Projection Sintering (LAPS), a form of AM is utilized. LAPS uses a visible light projector to heat the entire desired shape in the XY-plane simultaneously, as shown in FIG. 2. By allowing even melting through moderate heating and extended timespans, LAPS provides additional sintering time for the powder to melt and densify into the desired cross section. This increased time reduces thermal gradients both across and within the part bed. Increasing the timescales for the heating process allows for greater transfer of heat from the surface layers to those below, allowing for greater fusion between layers [Bourell, D. L., et al.]. After heating, each layer is exposed to ambient temperatures on the top surface. By processing an entire 2D area rather than a point, effective build rates can be maintained, despite the longer heating time.

It is desired to characterize the mechanical properties of parts built by LAPS and compare them to parts produced by commercial polymer powder bed fusion processes via LS and Multi Jet Fusion (MJF) technology using similar materials. MJF technology is a technology similar to the high speed sintering (HSS) process [Ellis, A., et al., Journal of Materials Research, 2014. 29(17):2080-2085]. MJF and HSS both use inkjet printing technology to print a black dye in the 2D shape into the powder bed surface of the desired cross section. A linear high intensity heat lamp is then scanned over the powder bed. The radiated heat is readily absorbed by the areas with black ink, sintering those particles together. However, areas without ink reflect away most of the light energy and do not achieve a molten state. Longer exposure times are utilized in MJF/HSS (~1 s) which has been shown to increase elongation at break (EaB) significantly as more time is available to fully densify and melt the powder [Ellis, A., et al. Additive Manufacturing, 2014. 1-4:48-51]. Powder bed fusion processes of varying exposure times and their effect on mechanical properties are compared. LAPS, MJF and HSS exhibit superior mechanical properties in the form of EaB, and LAPS components exhibit higher ultimate tensile strength (UTS) compared to commercially produced MJF and LS components.

Experimental Methods

Sample Preparation: Large Area Projection Sintering (LAPS), is a novel AM technology that provides an area-wise sintering method capable of controlled exposure times, light intensities and part bed temperatures. As each layer is sintered, a new layer of powder is spread uniformly using for example a counter-rotating roller to achieve a spread density (0.51 g/cm$^3$) near to that of the tapped density (0.54 g/cm$^3$).

In the present exemplary embodiment, the power of the projected light was 5.5 W over a 2.1 by 1.6 cm area, providing an average light intensity of 1.64 W/cm$^2$ for five seconds. This provides effective area-based heating capable of extending exposure times without sacrificing overall build speeds. LAPS parts were produced from PA2202, a carbon black doped PA12 (EOS GmbH), which is a powder manufactured for the laser sintering industry. The powder was exposed to an open atmosphere but preheated by a heated bottom plate maintained at 170° C. The top surface was monitored by an SC4000 FLIR medium wave infrared camera. An infrared heat lamp was used to heat the top surface to 170° C. prior to each sintering exposure. Because the build chamber is not completely enclosed, parts may cool below the recrystallization temperature while spreading the next layer. To see the impact of cooling rates, quenched LAPS PA 2202 samples were produced by heating LAPS components in a furnace at 190° C. for 10 minutes then rapidly placed into room temperature water. Slow cooled LAPS PA 2202 samples were produced by reheating to 190° C. for 10 minutes followed by furnace cooling at 1° C./min.

LS parts were produced by two different sources. One batch of LS samples was fabricated by ProtoLabs on a 3D Systems sPro 60 using PA 650 which is a PA12 powder similar to PA2202 but without the carbon black doping. A second subset of LS tensile parts were produced by the University of Sheffield on their industrial EOS Formiga P100 laser sintering system. Their typical processing conditions [Crane, N. B., et al., Additive Manufacturing, 2017. 13:149-155] were selected which used 50% virgin and 50% recycled PA2000 powder. PA2000 powder is also a white PA 12 powder and similar to the PA 650 and PA2202, all of which are produced by EOS. Lastly, Multi Jet Fusion (MJF) components were produced by Engineering Manufacturing Services (EMS) on an HP Jet Fusion 3D 3200. The material used in the MJF components is also a PA 12 powder which the data sheet refers to as high reusability powder optimized for AM. Parts for all systems were produced in the same orientation, where the thickness of the part is aligned with the Z axis of the machine.

Rheology: A TA Instruments AR 2000 rheometer was used in steady shear mode to characterize EOS GmbH PA2202 powder. Powder stored at ambient conditions were compression molded into cylindrical disks of 25 mm diameter at ca. 180° C. and 6 metric tons force. These storage conditions best represent the powder used in the LAPS printing process. A shear ramp from 0.001 s-1 to 125 s-1 at a constant gap of 500 μm was used to determine the zero shear plateau region of the compressed powder cylinders at 190° C. A shear rate from within the zero shear region was chosen of 0.1 s-1 for isothermal 190° C., 230° C. and 260° C. peak hold experiments at constant gaps of 1000 μm to determine the viscosity as a function of time.

Differential Scanning calorimetry: A TA Instruments Q20 was used for differential scanning calorimetry (DSC) measurements. Samples of powder and parts were placed in hermetically-sealed DSC pans with masses of 10.0 mg±0.5 mg. Temperature ramps were conducted under nitrogen purge of 50 mL/min from 25° C. to 250° C. at 20° C./min. A theoretical heat of fusion for LS PA-12 of 209.3 J/g for a 100% crystalline sample is used for DSC calculations [Van Hooreweder, B., et al., Polymer Testing, 2013. 32(5):972-981]. The first heat cycle was utilized for all calculations. Exterior unsintered material was lightly ground off with a rotary tool, and clippers were used to remove small pieces at orthogonal orientations to layering for best thermal contact with the bottom of the hermetically sealed DSC pan.

Polarized Light Microscopy: Printed parts of various geometries were cut to reveal the interior structure which was then sectioned via microtome to approximately 5 microns thick and mounted to glass slides. A Leica DMRX light microscope was used for characterization.

Tensile Testing: A MTS® 858 Table Top servohydraulic tensiometer was used and control was provided via a MTS® FlexTest SE controller. Three samples were made or ordered for four different additive technologies. The samples provided by EMS and the LS samples provided by ProtoLabs meet ASTM standard 638-10 type IV specimens, the LS samples provided by the University of Sheffield used type I specimens and the LAPS components were scaled down to the maximum size capable in the prototype LAPS system; providing a gauge length of 4 mm and an extended gauge width (~4.5 mm) to provide a larger measurable force. All of the test samples including the LAPS samples were approximately 1 mm thick. Crosshead speed was 1 mm/min. All tests were conducted at room temperature.

Results

Rheology: PA12 polymers for laser sintering often contain reactive chain ends unless the polymer or synthetic procedure is modified to increase recyclability. These end groups can react at elevated temperatures, particularly above the Tm, to increase molecular weight which has a large effect on viscosity for a linear polymer. The effects of molecular weight increases on viscosity for PA12 powders have been confirmed by GPC studies, showing an increase in molecular weight for aged powders which have undergone postcondensation [Dadbakhsh, S., et al.]. Postcondensation phenomena have been noted by a number of authors for EOS GmbH PA2200 [Drummer, D., K. et al. Proceedings of PPS-30. 2015. Cleveland, Ohio and Haworth, B., et al., Rapid Prototyping Journal, 2013. 19(1):28-36]. EOS GmbH PA2202 powder exhibited an initial viscosity of 660 Pa·S and within 10 minutes the viscosity increased to 800 Pa·S at 190° C. The powder reached a viscosity of approximately 1300 Pa·S after 30 minutes. Similarly, the viscosity increased to 1900 Pa·S at 230° C., and 2760 Pa·S at 260° C. after approximately 30 minutes. These data confirm that PA2202 powder is not modified to reduce postcondensation reactivity and remains reactive at elevated temperature.

Differential Scanning calorimetry: Unsintered virgin PA12 powder for both PA 650 and PA 2202 show a single, high temperature, melt endotherm with a percent crystallinity of 42.7% and 47.6%, respectively, as shown in Table 1. The DSC tabulated data comparing virgin powder to MJF, SLS and LAPS build processes is also shown in Table 1. A theoretical heat of fusion of 209.3 J/g for a 100% crystalline LS PA12 sample is used.

These relatively large percent crystallinities for a semicrystalline polymer are reported to be the result of the thermal history obtained from the PA12's fabrication process. The crystals of PA12 can exist in two forms, alpha and gamma. Virgin PA12 powder exists in the alpha (α) monoclinic form. Upon melting, these regions form a gamma (γ) (pseudo) hexagonal form due to faster cooling rates [Liangbin Li, et al. Macromolecules 2003. 36:1626-1632]. These two crystal forms can interconvert above the glass transition temperature or during tensile straining [Van Hooreweder, B., et al.]. The virgin PA12 powders tested here exhibit an onset melting point of ca. 180° C. with a peak at ca. 190° C., falling within the range reported by Dadbakhsh for PA 2200. A number of authors have reported that there is often incomplete melting of the powder resulting in two visible endotherms in DSC [Dadbakhsh, S., et al., Majewski, C., H. et al. and Zarringhalam, H., C. et al.].

Figure 4:
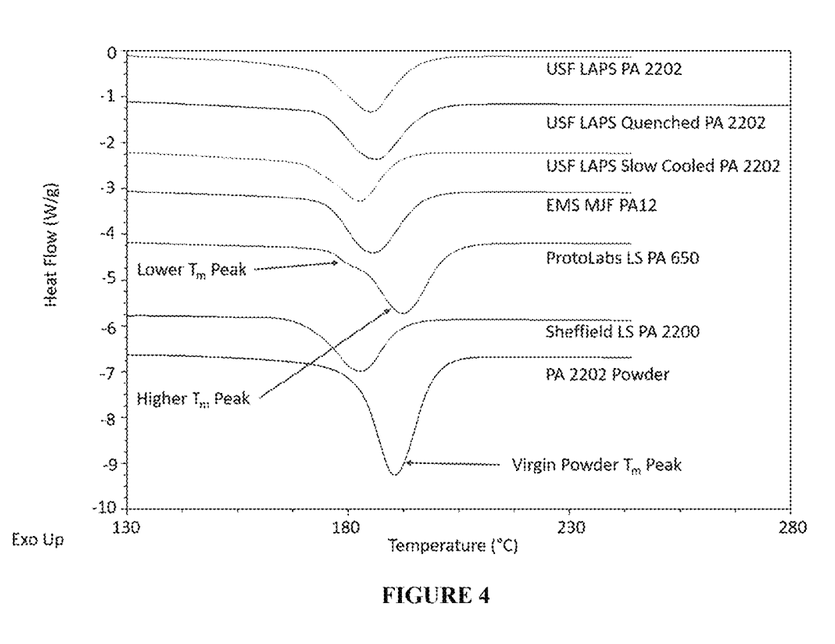
FIG. 4 is a graph showing DSC thermograms of LAPS (PA 2202), quenched LAPS (PA 2202), slow cooled LAPS (PA 2202), EMS MJF (PA12), Proto Labs LS (PA 650), Sheffield LS (PA 2200), and virgin PA 2202.

This two-endotherm pattern is seen in the ProtoLabs LS parts tested here with the lower temperature endotherm reduced to that of a small shoulder of the higher temperature endotherm, as shown in FIG. 4. This pattern suggests largely incomplete sintering of the PA12 polymer as evidenced by significant residual core material remaining in the finished part, as shown in FIG. 5. The higher temperature endotherm is elevated by a few degrees above the origional powder's endotherm. This may be evidence of molecular weight increase or light chemical crosslinking due to time spent at elevated temperatures typically seen with laser sintering, and reported in the literature [Drummer, D., K. et al.]. Sheffield's LS parts exhibited a broad and lower temperature peak Tm (186.3° C.) compared to ProtoLab's LS parts (192.5° C.). There is no evidence of a lower melting endotherm in the Sheffield sample, and it displays a morphology similar to those yielded by LAPS and MJF parts with few or no unmelted cores visible.

Parts produced with lower heating rates (LAPS and MJF) yield thermograms with a single, broad, endotherm centered about 185° C. with onset points ranging from 171 to 174° C., as shown in FIG. 4. This suggests that the particles completely melted during sintering accounting for the absence of the higher temperature endotherm seen in the ProtoLabs LS samples and virgin PA12 powder.

Figures 3A, 3B:
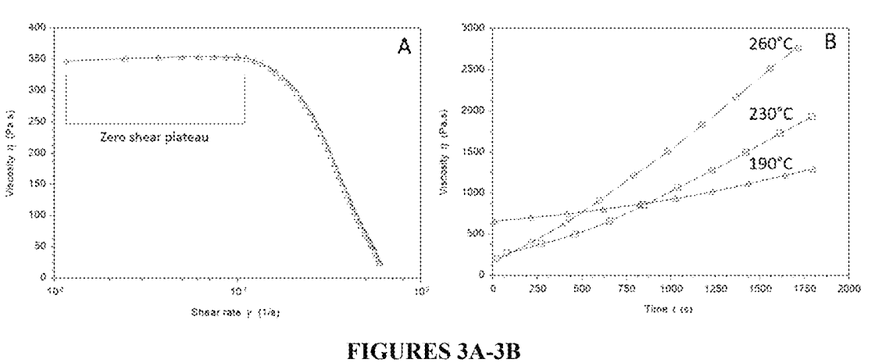
FIG. 3A shows shear ramp to determine zero shear plateau.
FIG. 3B shows viscosity as a function of time at 190° C., 230° C. and 260° C. for 30 minutes.

All parts show significantly reduced crystallinity relative to the virgin powder, with the Proto Labs LS part showing the highest (36.8%) of the technologies evaluated here, despite starting with the lowest initial crystallinity. This is likely due to the unmelted cores. The other samples (Sheffield LS, MJF, LAPS) have crystallinity between 30-33%. The LAPS-produced quenched PA2202 part displayed the lowest percent crystallinity of all (23.1%) owing to the extremely rapid cooling rate post-build. The LAPS-produced slow cooled part displayed a crystallinity of 26.1% which is intermediate between the crystallinities of typical and quenched LAPS samples. This interesting behavior may be due to carbon black pigment particles playing a role in the spherulite nucleation and growth, and will be an interesting area of future research. Alternatively, the increased time spent above the Tm may have increased the molecular weight with postcondensation of reactive chain moieties, as seen in FIG. 3. An increase in the molecular weight of a semicrystalline polymer can cause a delay in crystallinization. While it is difficult to quantify a DPM due to the mall size of the lower temperature endotherm of the ProtoLab parts, the predominate endotherm corresponding to the unsintered PA12 core material which indicates a low DPM. This suggests that a significant fraction of the spherulites present in the Proto Labs parts were not melted during sintering.

Figures 5A, 5B, 5C, 5D, 5E:
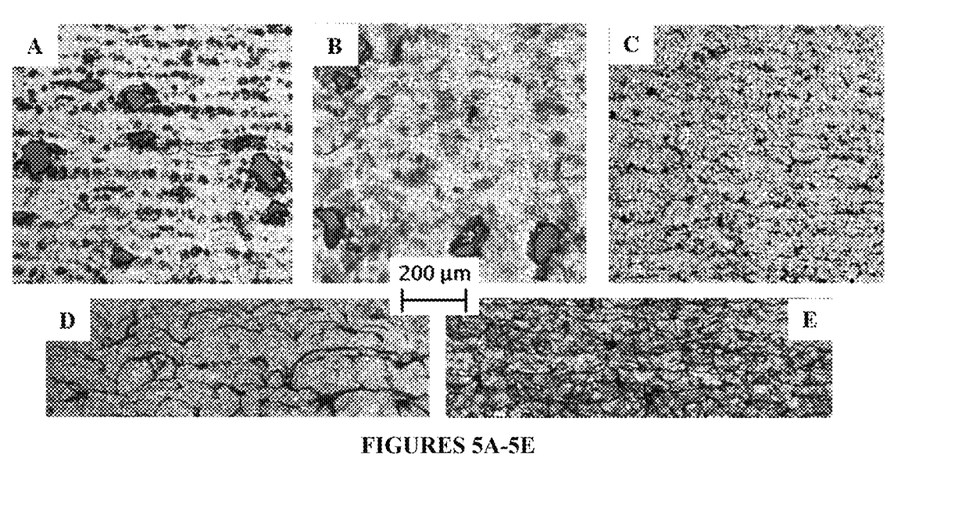

Polarized Light Microscopy: As the micrographs depict in FIG. 5, the ProtoLabs LS of the parts in FIG. 5A show incomplete melting evidenced by the presence of residual core material and significant number of large pores consistent with the DSC thermograms as discussed above. This observed correlations of low DPM and high porosity is reflected in the literature on LS [Majewski, C., H. et al.]. The cores appear to be stratified and repeat at ca. 200 μm intervals through the sample. It is likely that these cores are stratified along the Z-axis of the build part with highest core density occurring farthest from the laser beam due to low heat flow and resultant lower temperature of the polymer powder at that distance. The Sheffield LS parts shown in FIG. 5B show little in the way of residual cores which is corroborated by DSC data with a broad, low melting endotherm, corresponding to high DPM.

Further, it is evident from the micrographs that pores are present which fully transcend the roughly 5 µm section thickness in both the ProtoLabs LS (10-100 µm pore diameter) and Sheffield LS (50-130 µm pore diameter) parts. This phenomenon may either result from the release of oligomeric polyamide or residual solvent which create voids as the gases expand, large defects in the spread powder bed, or insufficient energy density delivered from the laser to achieve sufficient melt flow [Caulfield, B., et al.]. It is reported by Vasquez et al that temperatures during LS can reach >320° C. where mass loss is detectable by TGA. Pores decrease strength and modulus but have a particularly deleterious effect on ductility.

The micrograph of the multi-jet fusion (MFJ) part, shown in FIG. 5C, reveals more or less complete sintering with little in the way of detectable cores. Again, this is reflected in the DSC thermograms with the presence of only a single, broad, melt endotherm centered at a lower temperature and no detectable higher temperature endotherm or shoulder corresponding with unmelted nylon-12 cores. The wavy dark regions likely originate from the dye used in the MJF process, perhaps reflecting the ink movement as the powder flows during the sintering process. Very few pores were detectable by microscopy, and they appear to be far smaller (ca. 50 µm pore diameter) and more circular in cross section than those found in the LS parts. Some of these pores appear to transcend the microtome slice thickness (~5 µm) whereas others appear to be shallower.

The fully formed LAPS parts show neither residual core material nor pores within the interior of the sample, as shown in FIG. 5D. The lack of detectable cores is reflected by similar thermogram patterns of the MJF sample. However, at the edges of the part (XY-plane) some core material is present in the form of loosely attached powder from the powder bed (which can be visualized in the micrograph). For comparison, a purposefully undersintered (three second exposure) LAPS part, in FIG. 5E, shows the presence of some cores and pores which transcend the entire thickness of the cross-section.

Figure 6:
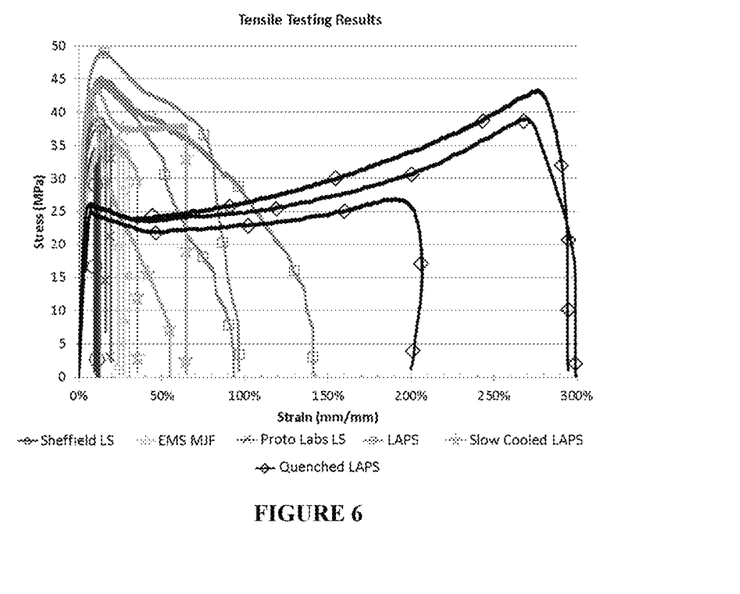
FIG. 6 is a graph showing tensile testing stress-strain curves in triplicate for the LS, MJF, and LAPS components.

Tensile Testing: Tensile testing, as shown in FIG. 6, revealed that even though each process utilizes very similar materials, the mechanical properties are highly dependent on the processing conditions. As shown in Table 2The coupons created by LS (ProtoLabs and the University of Sheffield) exhibited the lowest elongation at break (EaB) of 11 and 16% respectively, but had a similar ultimate tensile strength (UTS) (34.5 MPa and 38.7 MPa) as the coupons created by MJF (35.3 MPa). The coupons created by LAPS process showed a significantly improved UTS (46.3 MPa) and EaB (110%) by comparison. The LAPS UTS values are comparable to LS PA 2202 material data sheet values. and show significantly increased EaB approaching that seen for IM nylon (24% PA 2202 datasheet, 110% LAPS PA 2202, 200-300% for IM). During testing the LAPS tensile coupons exhibited ductile failures in which the samples slowly tore apart. Despite large variation in EaB (probobly due to the largely manual manipulation of the print process in the prototype implementation), the LAPS samples were clearly superior in EaB to datasheets values of the same material processed by LS.

Since the LAPS parts produced modulus and UTS values comparable to datasheet values, it is likely that the other processes may yield similar UTS if sufficiently optimized. However, neither the datasheets, the LS (ProtoLabs and Sheffield) nor MJF parts exhibited EaBs comparable to LAPS. This suggests a fundamental difference in the mechanical properties due to the different processing conditions. Further study is needed to determine what these processing differences may be, and if these technologies could benefit from possible optimization. Ultimately, LAPS produced parts exhibiting UTS and modulus values comparable to LS PA12 datasheet values but with vastly improved toughnes, with EaBs approaching values traditionally seen in IM-grade PA12 parts. Interestingly, the LAPS modulus remained comparable to the LS parts showing that stiffness was not sacrificed for toughness.

The quenched and slow-cooled samples provide some indication of the impact of the impact of cooling on the parts. EaB of the standard LAPS samples is intermediate between the slow cooled and quenched samples, but all are above the LS and MJF materials. DSC data shows (Table 1), the quenched samples display a percent crystallinity of only 23% compared to the range displayed for the remainder of the parts of ca. 30 to 37%. Crystalline domains normally serve as physical crosslinks, tying together adjacent polymer chains and reducing their freedom of movement during imposed strain. Strength of the quenched samples was reduced to that LS components while elastic modulus was reduced by half. The slow cool sample showed lower crystallinity than the original LAPS samples, but increased modulus of elasticity and comparable strength. This may be explained by an increase in MW during the hold at 190 C and slow cool increasing strength while limiting crystallinity. There may also be affects of the carbon black in the black PA12 on the nucleation and growth of spherulites.

The reduced EaB of LS PA12 compared to IM is thought to be the result of increased crystallinity and reduced chain entanglement in LS parts [Bourell, D. L., et al.]. Residual porosity likely plays a role as well. Pores degrade UTS, Young's Modulus, and elongation at break [Rouholamin, D. et al.]. Both LS printing processes displayed porosity in optical images. High scan rates are used in LS to reduce build time at the expense of complete melting which reduces tensile properties in some LS conditions [de Oliveira Setti, G., et al., Rapid Prototyping Journal, 2014. 20(4): 285-290]. When pores and unmelted cores are present, mechanical properties are reduced. Moreover, these defects are concentrated between layers leads to create anisotropy [de Oliveira Setti, G., et al.]. Prior efforts were unable to eliminate porosity by adjusting standard LS processing conditions [Rouholamin, D. et al.]. This suggests that LS may be limited in producing parts of the highest mechanical performance due to the process's timescales. Conversely, the MJF parts exhibited complete sintering albeit with a few, relatively small, pores and the LAPS parts showed neither detectable cores nor porosity. Both MJF and LAPS use substantially longer sintering times. It is notable that the LS processes typically utilize a mix of virgin and aged PA12 powder for peak properties and improved utilization rates while the LAPS parts were made with virgin powder. Further work is needed to assess the importance of the thermal history of the powder on LAPS parts.

It is postulated that the increased timespans (seconds) at elevated temperature allow for complete melting and greater viscous flow without the localized excessive heating in laser scanning that could induce significant degradation or cross linking. Greater bulk flow and complete core melting could allow for reduced particle boundaries and increased entanglement. Bourell et al. posit that boundaries between spherulites exert the largest influence over part ductility. Further, it is postulated that the rather quick cooling incurred by LAPS-printed coupons between layers and post-build limits spherulite size, producing small and numerous spherulites and increasing ductility versus the LS coupons which are slowly cooled to prevent warpage. These results show that cooling rates may have a strong impact on mechanical properties. With improved understanding of these relationships, future systems might be able to tune the stiffness and toughness or parts or even regions of a part for the specific application requirements.

Dadbakhsh et al. propose that the mobility of the amorphous regions which link crystalline domains influences ductility, with the size and number of spherulites serving to "lock" these amorphous regions together. This is supported by the tensile data for the LAPS quenched parts with reduced crystallinity demonstrating high EaB but low Modulus. It is believed that the reduced particle boundaries due to complete core melting and entanglement of neighboring amorphous regions during the extended molten build process of the powder serve to generate the properties of the LAPS process. Amorphous regions of the semicrystalline polymer are responsible for the observed ductility of the parts, and crystalline domains lock the chains together at larger scales to maintain modulus and UTS.

Summary: Different methods for powder bed fusion of PA12 powders have been compared. The results show that the processes typically produce similar levels of crystallinity, but that mechanical properties differ significantly between methods-especially in the elongation at break. LAPS samples also demonstrate greater mechanical strength than the other processes. The samples shown do differ in their levels of porosity with the lower porosity samples having higher elongation. Additionally, cooling rate appears to play a significant role. The LS and MJF processes maintain a high temperature bed to avoid recrystallization during sintering and cool slowly after process completion. Both processes also show reduced porosity and increased elongation at break. However, the LAPS process as currently implemented may not maintain the temperature above recrystallization during processing and cools more quickly at the end of fabrication. This contribute to microstructure differences that increase elongation at break.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. A sintering method comprising:
    (a) providing a layer of powder material on a platform; wherein the powder material is not a metal and comprises a polymer;
    (b) projecting an incident light from a source onto a surface area of the layer of powder material, wherein the incident light is projected for a sufficient time to densify the layer of powder material and form a layer of densified material, and wherein densifying the layer of powder material comprises melting the powder material, and wherein an area of the incident light projected on the surface of the layer of powder material and a thickness of the layer of powder material are in a ratio of at least 30:1, wherein the incident light is projected at a power level from 1 W/cm$^2$ to 50 W/cm$^2$;
    (c) cooling the layer of densified material to below its recrystallization temperature to solidify the layer of densified material to form a layer of sintered material; and
    (d) repeating steps (a) to (c) to form a sintered article in a layer-wise fashion,
    wherein the article comprises greater than one layer of sintered material; and
    wherein the powder material is premixed with a radiation absorber prior to step (a).

2. The method of claim 1, further comprising maintaining the platform at an elevated temperature below an initial melting temperature or glass transition temperature of the powder material and/or pre-heating the surface of the layer of powder material prior to step (b).

3. The method of claim 1, wherein the powder material further comprises a ceramic or a composite material.

4. The method of claim 1, wherein the polymer is selected from a polyamide, a polystyrene, a polyester, a polyacetal, a polyalkylene, cellulose, a poly ether ether ketone, a poly ether ketone, a poly ether ketone ketone, a poly (meth) acrylate, a polyimide, a thermoplastic urethane, a polyether, a polyketone, a polycarbonate, a thermoplastic elastomer, a polyolefin, a copolyester, a thermoplastic vulcanite, a polyethene, a polystyrene, a poly vinyl chloride, a blend thereof, a copolymer thereof, or a derivative thereof.

5. The method of claim 1, wherein the powder material comprises particles having an average particle diameter of from 5 to 250 microns.

6. The method of claim 1, wherein the layer of powder material has a thickness of from 10 microns to 1 mm.

7. The method of claim 1, wherein the source is selected from an image projector, an array of LED or laser, or an effectively constant exposure obtained by repeatedly scanning the incident light at high rate of speed over the surface of the powder material.

8. The method of claim 1, wherein the incident light is projected for a time span the same as formation of the layer of densified material having less than 5% by volume pores, as determined by the Archimedes density test.

9. The method of claim 1, wherein step (c) comprises cooling the layer of sintered material by exposure to ambient temperature, exposure to a cool air stream, depositing a cooler material on the layer of densified material, or in a thermally controlled chamber at a cooling rate of at least 1° C./min.

10. The method of claim 1, further comprising fusing individual subsections having an area of at least 3.36 cm$^2$ or an entire area of the sintered article and allowing each subsection or area to cool to form a 3D sintered article.

11. The method of claim 1, wherein the sintered article comprises less than 2% by volume pores, as determined by the Archimedes density test.

12. The method of claim 1, wherein the densified material is cooled at a rate of greater than 10° C./min, in step (c).

13. The method of claim 1, comprising heating a 2D area that is at least 3.36 cm$^2$ for a time span the same as formation of the layer of densified material having less than 5% by volume pores, as determined by the Archimedes density test.

14. The method of claim 1, wherein the powder material comprises a semi-crystalline polymer or amorphous polymer.

15. The method of claim 1, wherein the sufficient time is from 100 ms to 30 s.

* * * * *